(12) United States Patent
Atkinson et al.

(10) Patent No.: US 9,938,034 B2
(45) Date of Patent: Apr. 10, 2018

(54) METHOD AND APPARATUS RELATING TO MANUFACTURE OF MOLDS FOR FORMING CONTACT LENSES

(71) Applicant: CooperVision International Holding Company, LP, St. Michael (BB)

(72) Inventors: Hayden Atkinson, Tadley (GB); John Robert Gibson, Farnham Common (GB); Terence Michael Cook, Norwich (GB); James Bryan Cook, Beccles (GB); Justin Daniel Nardone, Simpsonville, SC (US); Houston Paul Tankersley, Pickens, SC (US); James Robert Craig, Telford (GB)

(73) Assignee: CooperVision International Holding Company, LP, St. Michael (BB)

(*) Notice: Subject to any disclaimer, the term of this patent is extended or adjusted under 35 U.S.C. 154(b) by 505 days.

(21) Appl. No.: 14/576,232

(22) Filed: Dec. 19, 2014

(65) Prior Publication Data
US 2016/0176092 A1   Jun. 23, 2016

(51) Int. Cl.
*B29C 45/26* (2006.01)
*B65B 55/02* (2006.01)
*B29D 11/00* (2006.01)
*B65B 25/00* (2006.01)
*B29L 11/00* (2006.01)

(52) U.S. Cl.
CPC .......... *B65B 55/02* (2013.01); *B29C 45/2675* (2013.01); *B29D 11/00259* (2013.01); *B65B 25/008* (2013.01); *B29L 2011/0041* (2013.01)

(58) Field of Classification Search
CPC ... B65B 55/02; B65B 25/008; B29C 45/2675; B29L 2011/0041; B29D 11/00173; B29D 11/00182; B29D 11/00259
See application file for complete search history.

(56) References Cited

U.S. PATENT DOCUMENTS

| | | |
|---|---|---|
| 5,160,749 A | 11/1992 | Fogarty |
| 5,238,388 A | 8/1993 | Tsai |
| 5,445,511 A | 8/1995 | Ito et al. |
| 5,466,147 A | 11/1995 | Appleton et al. |
| 5,540,410 A | 7/1996 | Lust et al. |
| 5,540,543 A | 7/1996 | Lust et al. |

(Continued)

FOREIGN PATENT DOCUMENTS

| | | |
|---|---|---|
| DE | 29723514 U1 | 10/1998 |
| EP | 0339642 A2 | 11/1989 |

(Continued)

OTHER PUBLICATIONS

International Search Report and Written Opinion issued in corresponding International Patent Application No. PCT/GB2015/054050 dated Mar. 7, 2016 (10 pages).

(Continued)

*Primary Examiner* — Mathieu Vargot
(74) *Attorney, Agent, or Firm* — Kilyk & Bowersox, P.L.L.C.

(57) ABSTRACT

Methods and apparatus for exchanging tools and/or tool assemblies used to form different types of molds for in injection-molding machines, are described. The exchange of tools and/or tool assemblies is made using a robot. Contact lens mold halves and assemblies for molding contact lenses of different powers or types can be made with a single injection-molding apparatus.

14 Claims, 11 Drawing Sheets

(56) References Cited

U.S. PATENT DOCUMENTS

| | | |
|---|---|---|
| 5,545,366 A | 8/1996 | Lust et al. |
| 5,681,138 A | 10/1997 | Lust et al. |
| 5,702,735 A | 12/1997 | Martin et al. |
| 5,716,540 A | 2/1998 | Matiacio et al. |
| 5,776,514 A | 7/1998 | Wu et al. |
| 5,850,107 A | 12/1998 | Kindt-Larsen et al. |
| 5,861,114 A | 1/1999 | Roffman et al. |
| 5,928,682 A | 7/1999 | Janca et al. |
| 5,938,988 A | 8/1999 | Lust et al. |
| 5,975,875 A | 11/1999 | Crowe, Jr. et al. |
| 5,980,184 A | 11/1999 | Lust et al. |
| 5,981,618 A | 11/1999 | Martin et al. |
| 6,007,229 A | 12/1999 | Parnell, Sr. et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,186,736 B1 | 2/2001 | Lust et al. |
| 6,368,522 B1 | 4/2002 | Ansell et al. |
| 6,405,993 B1 | 6/2002 | Morris |
| 6,444,145 B1 | 9/2002 | Clutterbuck |
| 6,502,009 B1 | 12/2002 | Parnell, Sr. et al. |
| 6,511,617 B1 | 1/2003 | Martin et al. |
| 6,592,356 B1 | 7/2003 | Lust et al. |
| 6,732,993 B2 | 5/2004 | Dean |
| 6,752,581 B1 | 6/2004 | Lust et al. |
| 6,827,325 B2 | 12/2004 | Hofmann et al. |
| 6,830,712 B1 | 12/2004 | Roffman et al. |
| 7,156,638 B2 | 1/2007 | Lust et al. |
| 7,156,641 B2 | 1/2007 | Ansell et al. |
| 7,516,937 B2 | 4/2009 | Hofmann et al. |
| 7,585,167 B2 | 9/2009 | Lawton et al. |
| 7,811,483 B2 | 10/2010 | Witko |
| 7,935,280 B2 | 5/2011 | Lawton et al. |
| 8,038,912 B2 | 10/2011 | Beebe et al. |
| 8,105,070 B2 | 1/2012 | Reynolds et al. |
| 8,221,659 B2 | 7/2012 | Beebe et al. |
| 8,287,269 B2 | 10/2012 | Dubey et al. |
| 2005/0167038 A1 | 8/2005 | Torris et al. |
| 2006/0145369 A1 | 7/2006 | Lawton et al. |
| 2006/0145370 A1 | 7/2006 | Lawton et al. |
| 2006/0145372 A1 | 7/2006 | Jones et al. |
| 2007/0052117 A1 | 3/2007 | Arnet et al. |
| 2007/0267765 A1 | 11/2007 | Ansell et al. |
| 2008/0102151 A1 | 5/2008 | Perez et al. |
| 2014/0103552 A1 | 4/2014 | Nakahashi et al. |

FOREIGN PATENT DOCUMENTS

| | | |
|---|---|---|
| EP | 0882560 A2 | 12/1998 |
| EP | 0888871 A1 | 1/1999 |
| EP | 0919352 A1 | 6/1999 |
| EP | 1561560 A1 | 8/2005 |
| EP | 1752280 A2 | 2/2007 |
| EP | 1752281 A2 | 2/2007 |
| EP | 1545865 B1 | 1/2008 |
| JP | H01-275111 A | 11/1989 |
| JP | 04361010 A | 12/1992 |
| JP | 08300425 A | 11/1996 |
| WO | 2000059713 A1 | 10/2000 |
| WO | 2001074574 A2 | 10/2001 |
| WO | 2008039485 A1 | 4/2008 |
| WO | 2008078395 A1 | 7/2008 |

OTHER PUBLICATIONS

International Preliminary Report on Patentability issued in corresponding International Patent Application No. PCT/GB2015/054050 dated Mar. 15, 2017 (24 pages).

Search and Examination Report issued in corresponding United Kingdom Patent Application No. 1422768.0 dated Jun. 19, 2015 (5 pages).

METHOD AND APPARATUS RELATING TO MANUFACTURE OF MOLDS FOR FORMING CONTACT LENSES

FIELD

The present disclosure relates to methods of, and apparatus for, manufacturing, by injection molding, mold halves suitable for use in forming contact lenses. In particular, it relates to apparatus and methods for exchanging tools and/or tool assemblies in injection molding machines in order to manufacture mold halves for different powers or types of contact lenses.

BACKGROUND

Various methods of manufacturing contact lenses are known, including spin casting, lathing (for example, by diamond turning) and cast molding (for example, using injection molded mold halves). Manufacture of soft contact lenses, including conventional hydrogel and silicone hydrogel contact lenses, presents particular difficulties, as contact lenses are delicate. Surfaces and edges of a contact lens, including surfaces providing vision correction, as well as surfaces and edges used to cast mold surfaces of a contact lens, must be manufactured and maintained to optical precision and all surfaces and edges must be manufactured within tight tolerances to provide a desired level of vision correction and/or provide a desired cosmetic appearance to the eye, and to avoid potential issues with discomfort or even damage to the eye of the wearer. Using high speed manufacturing lines, contact lenses can be manufactured in very large numbers, for example, tens of thousands each day. Increases in the rate of manufacture of contact lenses can be expected to bring down the cost of each lens. It is important, however, that increased rates of manufacture do not compromise the quality of the lenses produced.

SUMMARY

In accordance with the present disclosure, contact lenses can be manufactured by cast molding using single-use mold halves. Mold halves of a first type and of a second type can be manufactured. The mold halves can be shaped so that a mold half of the first type can be brought together with a mold half of the second type to define a cavity there between, the cavity having the shape of a contact lens that is to be manufactured. For example, the mold halves of the first type can be female mold halves, each having a concave surface of optical quality and that defines the front of the contact lens. The mold halves of the second type can then be male mold halves, each having a convex surface of optical quality and that defines the back of the contact lens. In forming the lens, a polymerizable composition can be placed in the female mold half. The male mold half can then be mated with the female mold half, defining a cavity in which the polymerizable composition is contained. The polymerizable composition can be cured in the cavity, for example, by exposure to ultraviolet light and/or by heating, and a polymerized contact lens body is thereby formed. The mold halves can then be separated and the contact lens body can be released or removed. The contact lens body can then be subjected to further processing, for example, hydration, to form a finished contact lens. The mold halves can be disposed of during the manufacturing process.

As the mold halves are typically single-use, the present disclosure provides an apparatus and method so that they can be made as efficiently as possible, without loss of quality. Contact lenses of several different powers can be made to provide lenses for different patients with different spherical refractive errors, i.e., different amounts of myopia or hyperopia. Toric lenses (lenses providing cylindrical correction), multifocal lenses, or lenses of other specific forms, can also be made. As it is not practical to provide a separate manufacturing line for each power of each type of lens, the apparatus and method of the present disclosure can use interchangeable tools or tool assemblies that can be robotically exchanged in order to manufacture different powers or types of lenses. The apparatus and method of the present disclosure reduce tool exchange time, maximize production, facilitate high speed manufacturing of contact lenses, and enable high speed manufacturing of a wide variety of powers and types of lenses.

A first aspect of the present disclosure provides apparatus for manufacturing mold halves for use in the manufacture of contact lenses. The apparatus comprises:

an injection-molding apparatus including a plate for carrying a removable collet;

a collet store for storing at least one removable collet configured to be inserted into the plate; and a collet-exchange robot configured to grip a removable collet from the plate, move the removable collet to the collet store, insert the removable collet into the collet store, grip a replacement collet from the collet store, move the replacement collet to the plate, and insert the replacement collet into the plate.

A second aspect of the disclosure provides a method of manufacturing mold halves for use in the manufacture of contact lenses. The method comprises:

using a robot to remove a first collet from a plate in an injection-molding apparatus, the first collet comprising a first tool half mounted therein, the first tool half defining at least a portion of a first injection-molding cavity for molding a contact lens mold half;

using the robot to transport the first collet to a collet store and insert the first collet into the collet store;

using the robot to remove a replacement collet from the collet store, the replacement collet comprising a second mold tool half defining at least a portion of a second injection-molding cavity for molding a contact lens mold half;

using the robot to transport the replacement collet to the plate and insert the replacement collet into in the plate; and forming a contact lens mold half in the second injection-molding cavity.

Using the robot to remove the first collet from the plate, using the robot to transport and insert the first collet, using the robot to remove the replacement collet, using the robot to transport and insert the replacement collet, or any combination thereof, can comprise moving a collet extraction head of the robot in three dimensions. Using the robot to remove the first collet from the plate, using the robot to transport the first collet and insert the first collet in the collet store, using the robot to remove the replacement collet from the collet store, using the robot to transport the replacement collet and insert the replacement collet in the plate, or any combination thereof, can comprise using a position sensor located on the robot. The position sensor can be located on the collet extraction head of the robot. Using the robot to remove the first collet from the plate, using the robot to transport the first collet and insert the first collet into the collet store, using the robot to remove the replacement collet from the collet store, using the robot to transport the replacement collet and insert the replacement collet in the plate, or any combination thereof, can comprise both moving the collet extraction head of the robot in three dimensions, and using a position sensor located on the robot.

DETAILED DESCRIPTION

Figure 1:
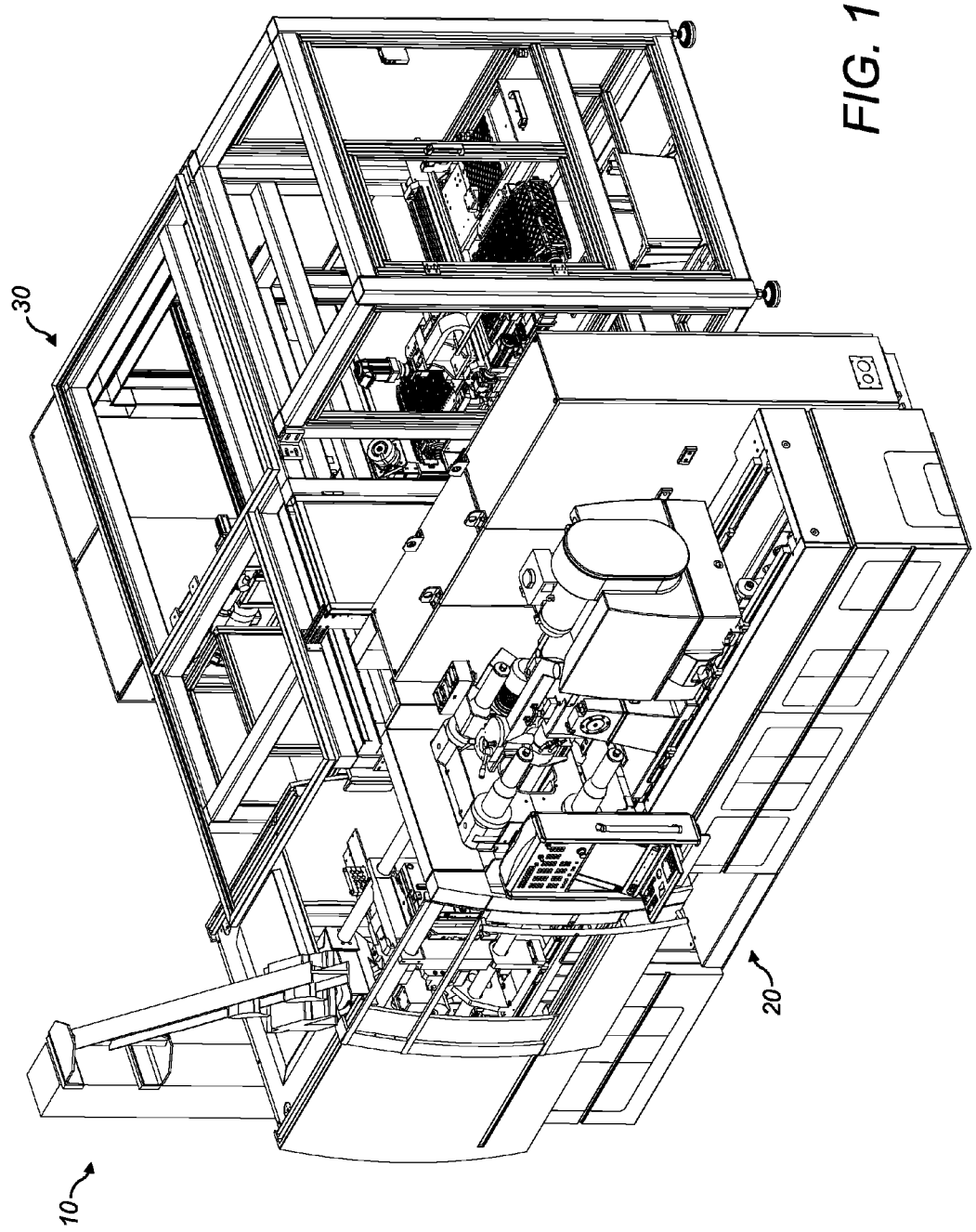
FIG. 1 is a perspective view of an apparatus according to an exemplary embodiment of the invention.

A first aspect of the present disclosure provides an apparatus for manufacturing mold halves for use in the manufacture of contact lenses. The apparatus comprises:
  an injection-molding apparatus including a plate for carrying a removable collet;
  a collet store for storing at least one removable collet configured to be inserted into the plate; and
  a collet-exchange robot configured to grip a removable collet from the plate, move the removable collet to the collet store, insert the removable collet into the collet store, grip a replacement collet from the collet store, move the replacement collet to the plate, and insert the replacement collet into the plate.

The skilled person will understand that specific features of embodiments of the invention described herein that are not incompatible with each other can be present in any combination in example embodiments of the invention.

Thus, for example, the apparatus can be any contact lens mold assembly embodying the invention, wherein the robot comprises at least one extraction head. The collet extraction head can be a collet extraction head that can be moved in three dimensions. In other words, the robot can be configured to move the collet extraction head not merely along a line or plane but in three-dimensional space, for example as defined by orthogonal x, y, and z axes. The collet extraction head of the collet-exchange robot can be rotatably mounted on the robot. Each collet extraction head of the collet-exchange robot can be rotatably mounted on the robot. The collet extraction head of the robot can comprise a gripping portion. Each collet extraction head of the robot can comprise a gripping portion. When the robot comprises a collet extraction head, the apparatus can further comprise a rail arrangement, and the robot can be configured to move from a position on the rail arrangement in which the collet exchange head is in front of the plate, to a position on the rail arrangement in which the collet extraction head is in front of the collet store.

The apparatus can be any contact lens mold assembly embodying the invention, wherein the plate of the apparatus includes or is associated with at least one clamp. The at least one plate clamp can be arranged to hold the collet in the plate. The apparatus can further comprise a removable collet in the plate, and a tool half mounted in the removable collet, wherein the injection-molding apparatus comprises a clamp configured to hold the removable collet in the plate.

The apparatus can be any contact lens mold assembly embodying the invention, wherein the collet includes at least one circumferential groove. The apparatus can further comprise a removable collet inserted in the plate, and a tool half mounted in the removable collet, wherein the collet includes a circumferential groove. The circumferential groove can be a circumferential groove upon which a gripper of a collet extraction head is arranged to act, or can be a circumferential groove upon which a clamp, for example, a plate clamp, is arranged to act.

The apparatus can be any contact lens mold assembly embodying the invention, wherein the he collet store comprises a housing for receiving the removable collet. The collet store can comprise a housing for receiving a plurality of removable collets. The collet store having a housing can comprise a turntable upon which the housing is mounted. The turntable can be rotatable from a first position in which the collet can be manually loaded into the housing, to a second position in which the collet can be removed from the collet store by the collet-exchange robot.

Herein, reference is made to mold halves, but it is to be understood that, although two mold halves may complement each other and together form a mold assembly, each mold half is not necessarily half of, or 50% of, the mold assembly. One mold half can comprise 20%, 30%, 40%, 45%, or the like, of a mold assembly while the other mold half can comprise 80%, 70%, 60%, 55%, or the like, of the mold assembly. Accordingly, while the two mold halves can make one whole mold assembly, it is to be understood that the two mold halves neither have to be of the same size nor do they have to be mirror images of one another. Similarly, while reference is made herein to tool halves, it is to be understood that two tool halves, that complement each other and together define a mold cavity, do not have to be of the same size or mirror images of one another.

The skilled person will understand that the features disclosed in the following paragraphs can be combined in any combination in example embodiments of the invention, and can be combined in any combination with the features disclosed above.

The collet of the apparatus can be a first collet or a replacement collet. The tool half can be carried in a front portion of the collet. The collet can include a disc-shaped front portion. The collet can include a frustoconical rear portion. The collet can include a disc-shaped front portion and a frustoconical rear portion. The collet can include a circumferential groove that can be, for example, around the disc-shaped front portion, if present.

Each plate of the at least one plate of the apparatus can comprise a plurality of collets. The plurality of collets can be a plurality of first collets or a plurality of replacement collets. The plurality of collets carried by the at least one plate can be arranged in a two-dimensional array.

The collet store of the apparatus can comprise a plurality of collets. The plurality of collets can comprise a plurality of first collets or a plurality of replacement collets. The plurality of collets carried by the collet store can be arranged in a two-dimensional array.

The collet exchange robot can comprise at least one collet extraction head. The at least one collet extraction head of the robot can be rotatably mounted on the robot. The collet exchange robot can comprise a drive unit carrying an arm, at a distal end of which is mounted a collet extraction head. The arm can be rotatably mounted on the drive unit. The arm can be rotatable from a first orientation in which the collet extraction head is on a first side of the drive unit, to a second orientation in which the collet extraction head is on a second side of the drive unit. The collet extraction head can be rotatably mounted on the arm. The collet extraction head can, for example, rotate up to 180 degrees. The apparatus can include a rail arrangement, upon which the drive unit is mounted, such that the robot is configured to move from a position on the rail arrangement, in which the collet extraction head is in front of the plate, to a position on the rail arrangement in which the collet extraction head is in front of the collet store. Thus, in the first orientation, the collet extraction head can have access to the collets in the quick-change plate, and, in the second orientation, the arm can have access to the collets in the collet store. Thus, in use, the collet exchange robot can be able to access collets from the plate, and transfer them to and insert them into, the collet store, and vice versa.

The collet extraction head can comprise a gripping portion. The gripping portion can include a sensor. The sensor can comprise a proximity sensor. The gripping portion can include a plurality of (for example, three) gripping fingers. The gripping fingers can be sized and configured to grip a circumferential groove in a collet.

The plate can include or be associated with a clamp arranged to hold the collet in the plate. The collet can include a circumferential groove, or a further circumferential groove, upon which the clamp is arranged to act. The collet can have multiple circumferential grooves, or a single circumferential groove. The plate clamp and the gripping fingers of the collet extraction head can both be configured to grab, secure, fit into, or otherwise act on, the same circumferential groove of the collet or different, respective, circumferential grooves of the collet.

The collet store can comprise a housing for receiving the collets. The collet store can comprise a housing for receiving the collets, and a turntable on which the housing is mounted. The turntable can be rotatable from a first position, in which the collets can be manually loaded into the housing, to a second position, in which the collets can be removed from the collet store by the robot.

The injection-molding apparatus, collet exchange robot, and collet store turntable can be controlled by a control unit. The control unit can control movement of the collet exchange robot arm, the collet extraction head, the drive units carrying the arm, the gripping features of the collet extraction head, the gripping features of the injection-molding apparatus, and the collet store turntable. The control unit can comprise one or more microprocessors for controlling the various drive units and motors, including those of the collet exchange robot and of the collet store turntable. Each motor and drive unit can be configured to communicate with the control unit. The one or more microprocessors can each have and execute control logic software. The drive units and motors can be connected via wiring to the control unit. The control unit can be located or housed proximate to the motors and drive units, or it can be remotely located.

The control unit can be connected to the injection-molding apparatus, collet exchange robot, and collet store turntable via at least one USB connection, wired and/or wireless connection, Ethernet connection, or any combination thereof. The control unit can receive control signals from a graphical user interface, from a control board, or the like. An operator can operate an operator control unit (OCU) for programming the control unit or for starting or stopping a manufacturing operation. Control signals generated by the OCU, automatically or in response to an operator's input, can be processed and controlled by the control unit, and delivered to the drive units and motors. The drive units and motors can communicate directly with the OCU. The injection-molding apparatus, collet exchange robot, and collet store turntable can be controlled by an autonomous control program in one or more microprocessor, giving the apparatus microprocessor autonomous capability to maneuver or manipulate the injection-molding apparatus, collet exchange robot, and collet store turntable. Commands can come from the Internet via Wi-Fi, remote computer terminal, GPRS modem, satellite phone, mobile phone, infrared, Ethernet, Firewire, other wireless or wired connection protocols, or combinations thereof.

A second aspect of the disclosure provides a method of manufacturing mold halves for use in the manufacture of contact lenses. The method comprises:

using a robot to remove a first collet from a plate in an injection-molding apparatus, the first collet comprising a first tool half mounted therein, the first tool half defining at least a portion of a first injection-molding cavity for molding a contact lens mold half;

using the robot to transport the first collet to a collet store and insert the first collet into the collet store;

using the robot to remove a replacement collet from the collet store, the replacement collet comprising a second mold tool half defining at least a portion of a second injection-molding cavity for molding a contact lens mold half;

using the robot to transport the replacement collet to the plate and insert the replacement collet into in the plate; and forming a contact lens mold half in the second injection-molding cavity.

Using the robot to remove the first collet from the plate, using the robot to transport and insert the first collet, using the robot to remove the replacement collet, using the robot to transport and insert the replacement collet, or any combination thereof, can comprise moving a collet extraction head of the robot in three dimensions. Using the robot to remove the first collet from the plate, using the robot to transport the first collet and insert the first collet in the collet store, using the robot to remove the replacement collet from the collet store, using the robot to transport the replacement collet and insert the replacement collet in the plate, or any combination thereof, can comprise using a position sensor located on the robot. The position sensor can be located on the collet extraction head of the robot. Using the robot to remove the first collet from the plate, using the robot to transport the first collet and insert the first collet into the collet store, using the robot to remove the replacement collet from the collet store, using the robot to transport the replacement collet and insert the replacement collet in the plate, or any combination thereof, can comprise both moving the collet extraction head of the robot in three dimensions, and using a position sensor located on the robot.

As already set out in respect of the first aspect of the invention, the skilled person will understand that specific features of embodiments of the invention described herein that are not incompatible with each other can be present in any combination in example embodiments of the invention.

The method can be any method embodying the invention, further comprising the step of stopping production of the molds in the injection-molding apparatus before using the robot to remove the first collet from the plate. The method can further comprise re-starting production of the molds in the injection-molding apparatus after using the robot to transport the replacement collet and to insert the replacement collet into the plate. Forming a contact lens mold half in the second injection-molding cavity can comprise forming a plurality of contact lens mold halves.

The method can be any method embodying the invention, wherein using the robot to remove the first collet from the plate comprises: moving a collet extraction head of the robot to a position in front of the first collet; moving the collet extraction head forwards toward the first collet; gripping the first collet with the extraction head; and moving the collet extraction head backwards, thereby extracting the first collet from the plate. Moving the collet extraction head of the robot to a position in front of the first collet can comprise determining a distance from the extraction head to the first collet, or from the extraction head to the plate. Determining the distance can comprise using a proximity sensor on the extraction head to determine the distance from the extraction head to the first collet. Using the robot to remove the first collet from the plate can comprise rotating the collet extraction head, for example, rotating the collet extraction head around an axis of rotation by an amount of from 90 degrees to 180 degrees.

The method can be any method embodying the invention, wherein gripping the first collet with the extraction head comprises gripping the first collet at a circumferential groove formed in the first collet.

The method can be any method embodying the invention, wherein coolant is removed from coolant passages associated with the first collet, prior to the removal of the first collet from the plate, and resupplied to said coolant passages after insertion of the replacement collet into the plate. Advantageously, the removal and resupply of the coolant can be synchronized with the movement of the robot, for example to reduce the time required to exchange the first collet and the replacement collet, and hence to reduce downtime of the injection molding apparatus.

The method can be any method embodying the invention, wherein, when the method comprises a method wherein the first collet is held in place in the plate with a clamp, the method further comprises releasing the clamp from holding the first collet prior to removing the first collet from the plate. The method can further comprise clamping the replacement collet into the plate from which the first collet was extracted. The method can further comprise moving the robot to a resting location after using the robot to insert the replacement collet in the plate.

The method can be any method embodying the invention, wherein using the robot to transport the first collet and insert the first collet into the collet store comprises moving the collet extraction head of the robot to a position in front of an empty aperture in the collet store; moving the collet extraction head forward, toward the empty aperture; and releasing the first collet into the empty aperture. Moving the collet extraction head of the robot to a position in front of the empty aperture can comprise determining a distance from the extraction head to the aperture, or from the extraction head to the collet store. Determining the distance can comprise using a proximity sensor on the extraction head to determine the distance from the extraction head to the aperture. Using the robot to insert the first collet into the collet store can comprise rotating the collet extraction head of the robot by an amount of from 90 degrees to 180 degrees.

The method can be any method embodying the invention, wherein using the robot to transport the replacement collet comprises moving the collet extraction head of the robot to a position in front of the replacement collet; gripping the replacement collet with the collet extraction head; moving the collet extraction head to the position in front of the plate from which the first collet was extracted; and inserting the replacement collet into the plate. Moving the collet extraction head of the robot to a position in front of the replacement collet can comprise determining a distance from the extraction head to the first collet, or from the extraction head to the plate. Determining the distance can comprise using a proximity sensor on the collet extraction head in determining the distance. The inserting the replacement collet into the plate can comprise rotating the collet extraction head of the robot by an amount of from 90 degrees to 180 degrees.

The method can be any method embodying the invention, wherein gripping the replacement collet with the collet extraction head comprises gripping the replacement collet at a circumferential groove formed in the replacement collet.

The method can be any method embodying the invention, wherein further comprising the steps of providing a complementary contact lens mold half; filling a polymerizable lens-forming composition into a concave lens-forming surface of the mold half or into the complementary mold half; combining the mold half and the complementary mold half to form a mold assembly having a lens-shaped cavity there between, containing the polymerizable composition; curing the polymerizable composition in the filled mold assembly, to form a polymeric lens body, by polymerizing the lens-forming composition in the lens-shaped cavity; demolding and delensing the polymeric lens body from both the mold half and the complementary mold half; optionally washing, extracting, hydrating, or any combination thereof, the released polymeric lens body; placing the released polymeric lens body in a contact lens package, optionally along with packaging solution; sealing the contact lens package; and sterilizing the sealed contact lens package to form a finished contact lens package containing a finished contact lens.

The skilled person will understand that the features disclosed in the following paragraphs may similarly be combined in any combination in example embodiments of the invention.

The method can include the step of stopping production of the molds in the injection-molding apparatus, for example, to exchange a collet. Forming a contact lens mold half in the second injection-molding cavity can comprise injection-molding a female contact lens mold half, or a male contact lens mold half. Forming a contact lens mold half can comprise injection-molding a plurality of contact lens mold halves.

Using the robot to remove the first collet from the plate can comprise moving a collet extraction head of the robot to a position in front of the first collet; moving the collet extraction head forward, toward the first collet; gripping the first collet with the collet extraction head; and moving the collet extraction head backward, extracting the first collet from the plate. Gripping the first collet with the collet extraction head can comprise gripping the first collet at a circumferential groove formed in the first collet. Using the robot to transport the first collet and insert the first collet into the collet store can comprise: moving the collet extraction head so that the collet extraction head is in a position in front of an empty aperture in the collet store; moving the collet extraction head forward, toward the empty aperture; and releasing the first collet into the empty aperture. Using the robot to transport the replacement collet can comprise: moving the collet extraction head to a position in front of the replacement collet; gripping the replacement collet with the collet extraction head; moving the collet extraction head to a position in front of the plate from which the first collet was extracted; and inserting the replacement collet into the plate. The replacement collet can be inserted into the same position in the plate, from where the first collet was removed, or inserted into a different position in the plate. Gripping the replacement collet with the collet extraction head can comprise gripping the replacement collet at a circumferential groove formed in the replacement collet. The method can further comprise releasing a clamp holding the first collet in place in the plate. The method can further comprise clamping the replacement collet into the plate from which the first collet was extracted. The method can further comprise moving the robot to a resting location after using the robot to insert the replacement collet into the plate.

A collet extraction head of the robot can be moved to a position in front of the collet that is to be removed from the plate. The extraction head can be moved forward, toward the collet that is to be removed from the plate. The collet extraction head can grip the collet, for example, in a circumferential groove of the collet. A clamp holding the collet in place in the plate can be released, leaving the collet free to be removed from the plate by the robot. The collet extraction head can move backward, extracting the collet from the plate. The robot can move the collet extraction head so that the collet extraction head is at a position in front of an empty aperture in the collet store. The collet extraction head can be moved forward, toward the empty aperture. The collet can be released into the empty aperture. The collet extraction head can be moved to a position in front of the replacement collet. The collet extraction head can grip the replacement collet. The collet extraction head can move backward, extracting the replacement collet from the collet store. The collet extraction head can be moved to a position in front of the plate from which it extracted the first collet. The robot can insert the replacement collet into the plate. The replacement collet can be clamped in place in the plate, for example, by action of a clamp acting on a circumferential groove of the replacement collet. The clamp can be part of the injection-molding apparatus, for example, a part of the plate. The robot can move to a resting location after inserting the replacement collet into the plate, and production of mold halves can be restarted.

The method can further comprise the steps of: providing a complementary contact lens mold half; filling a polymerizable lens-forming composition into a concave lens-forming surface of the mold half or of a complementary mold half; combining the mold half and the complementary mold half to form a mold assembly having a lens-shaped cavity there between, containing the polymerizable composition; curing the polymerizable composition in the filled mold assembly to form a polymeric lens body by polymerizing the lens-forming composition in the lens-shaped cavity; demolding and delensing the polymeric lens body from both the mold half and the complementary mold half; optionally washing, extracting, hydrating, or any combination thereof, the released polymeric lens body; placing the released polymeric lens body in a contact lens package, optionally along with packaging solution; sealing the filled contact lens package; and sterilizing the sealed contact lens package to form a finished contact lens package containing a finished contact lens.

With reference to the drawings, FIG. 1 shows an exemplary apparatus 10 for manufacturing molds for use in forming a contact lens. Apparatus 10 includes an injection-molding apparatus 20 and a take-out cell 30 housing a collet store and a collet-exchange robot. Injection-molding apparatus 20 includes an injection unit and a reciprocating unit 50 (FIG. 4).

Figure 2:
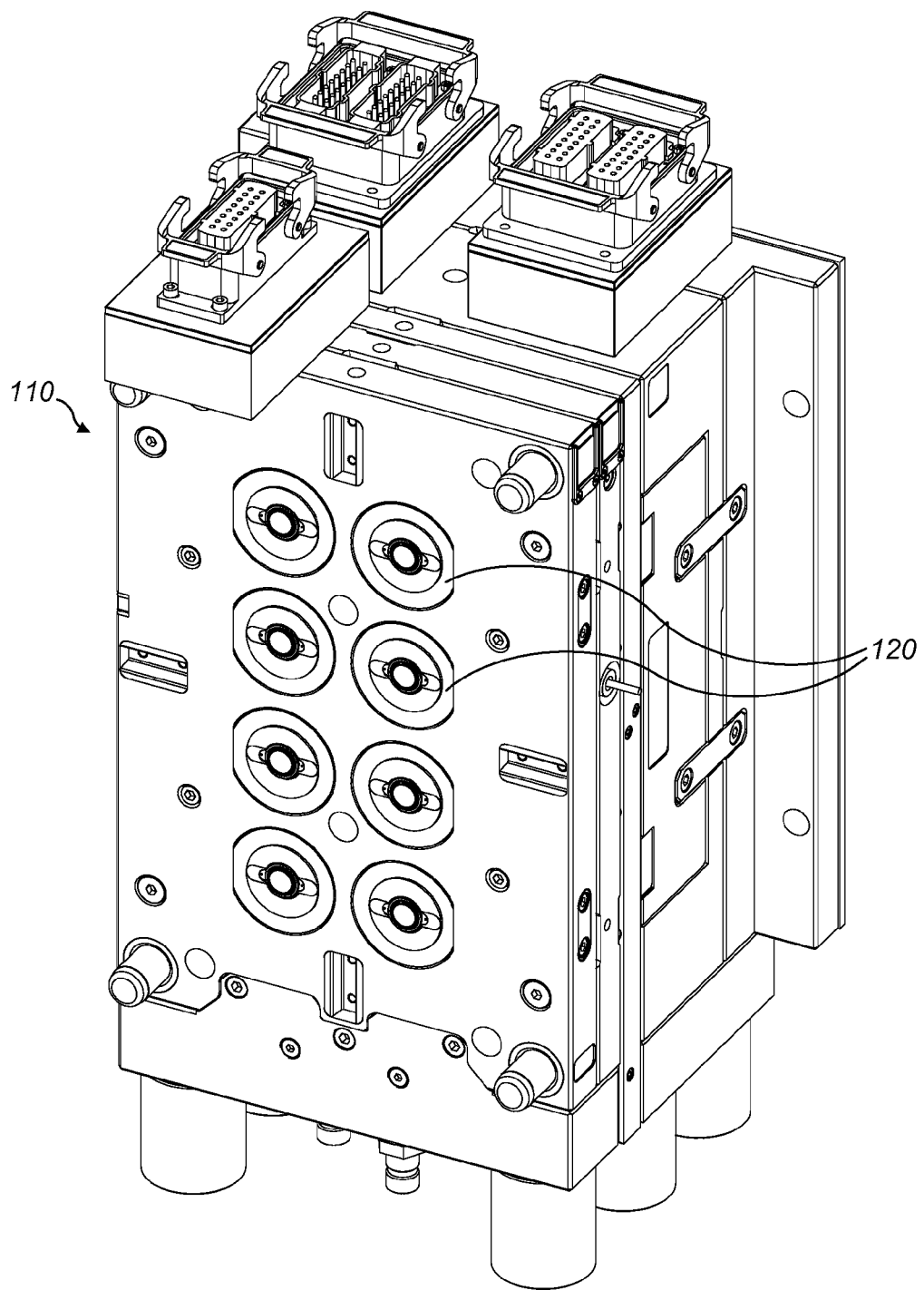
FIG. 2 is a fixed-plate apparatus forming part of an injection-molding apparatus, in accordance with an embodiment of the invention.
Figure 3:
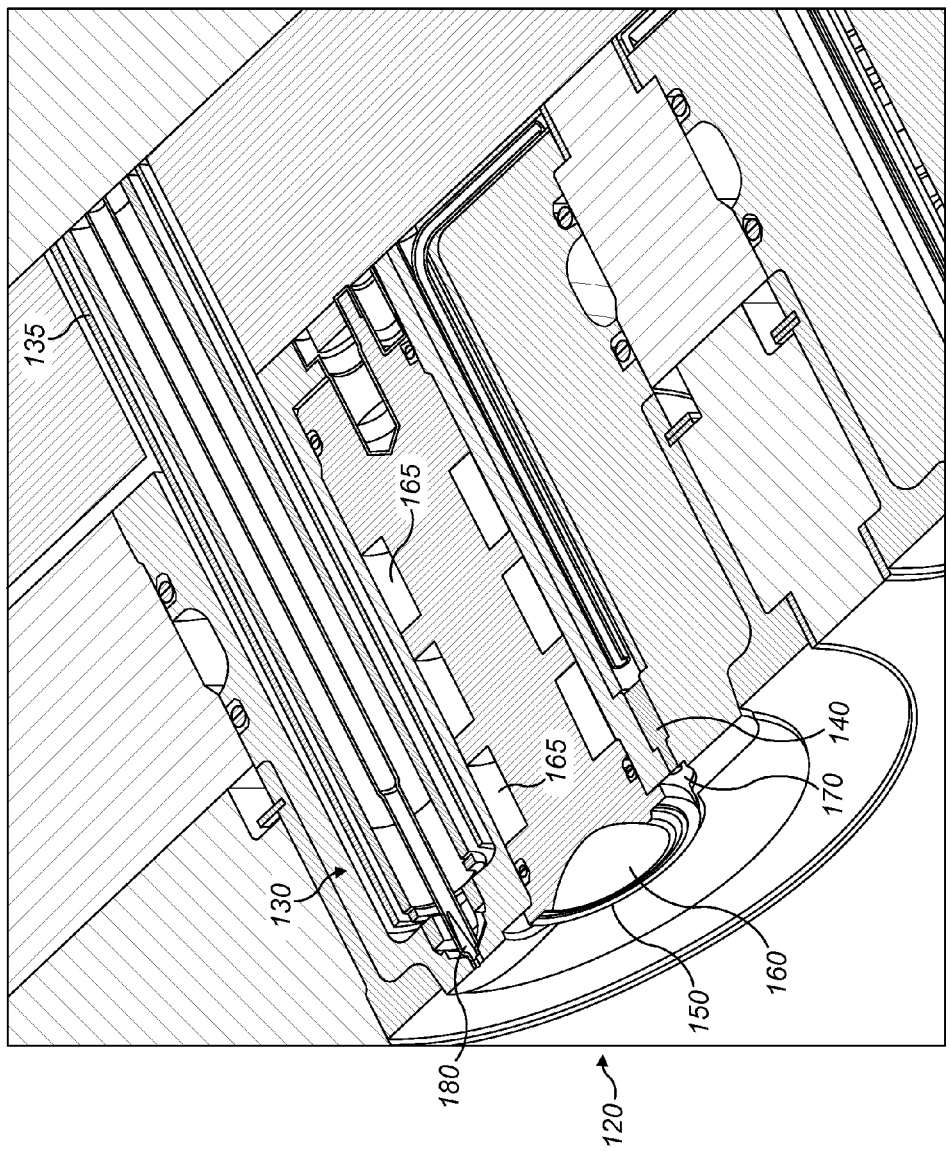
FIG. 3 is a partial cross-sectional view through a tool half of a fixed-plate apparatus, in accordance with an embodiment of the invention.

Injection unit includes a fixed plate 110 (FIG. 2) carrying, in this example, eight tool halves 120. As illustrated in FIG. 3, each tool half 120 includes an injection nozzle 130, a thermocouple 140, a tool portion 150, and a stripper plate at the front surface of fixed plate 110 (FIG. 2), which is arranged to move forward a few millimeters to eject formed molds. Tool portion 150 includes an outermost surface 160 that, in the example shown in FIG. 3, is concave and shaped to define a (convex) outer surface of a mold half to be formed in the injection cavity. In other, otherwise identical apparatus associated with this apparatus, a concave inner surface of a mold half is formed by providing a tool portion having an outermost surface that is convex. Coolant flow passages 165 are provided behind tool portion 150, passing approximately 4 mm from outermost surface 160 at their closest approach. The stripper plate defines a surface of peripheral regions 170 of the mold halves. The provision of peripheral regions 170 enables injection nozzle 130 and thermocouple 140 to be sited or located away from the center of tool portion 150, which in-turn makes room for coolant passages 165 to pass close to tool portion 150, where the surface of the contact lens mold half used to cast-mold the optic zone of a contact lens, is formed. The stripper plate is moveable from a rearward, mold-formation position, to a forward, mold-ejection position.

Reciprocating unit 50 (FIG. 4) comprises a mounting plate 190 mounted in a vertical orientation on a reciprocating drive 200.

Figure 4:
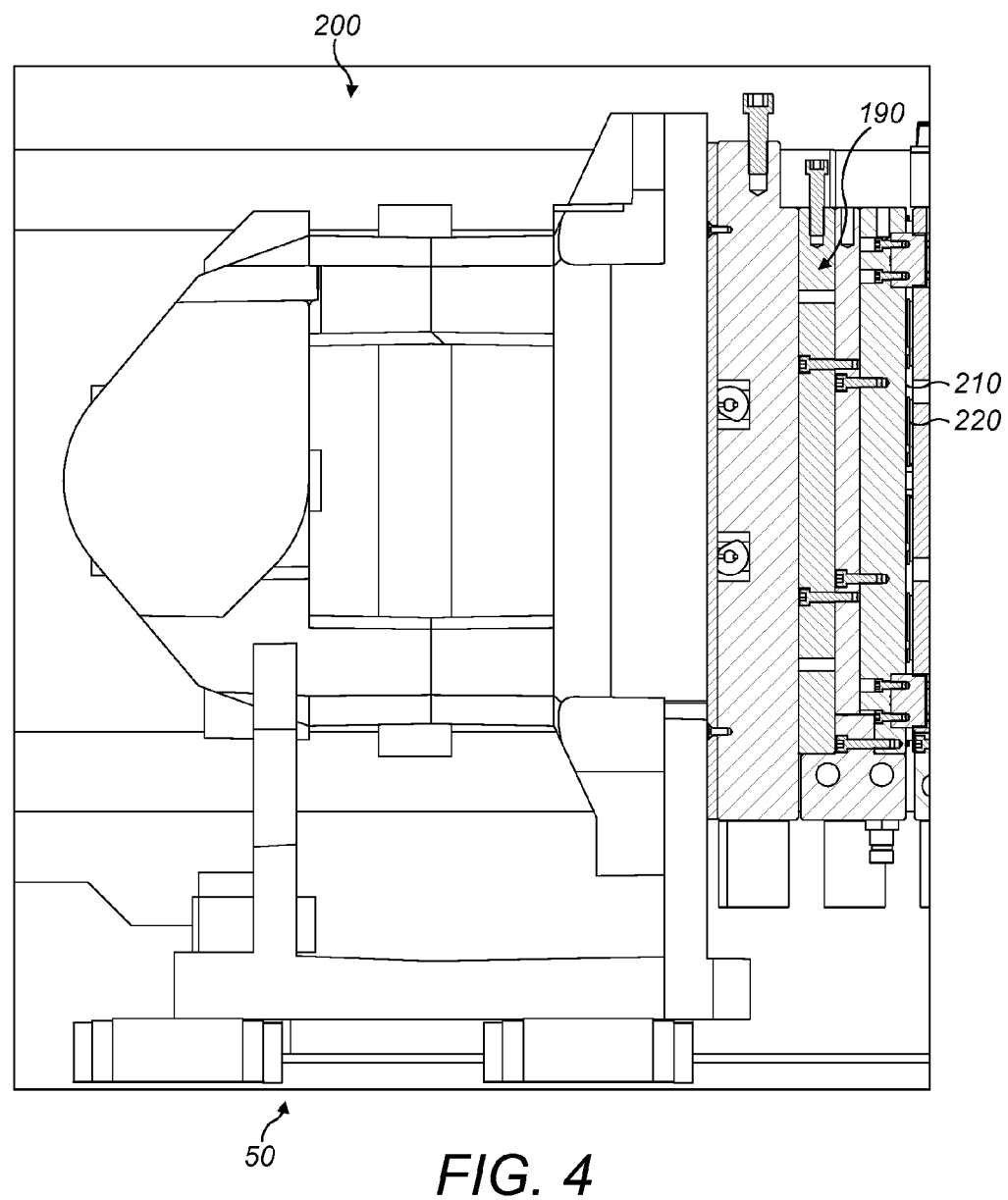
FIG. 4 is a cut-away view of a reciprocating unit of an injection-molding apparatus, in accordance with an embodiment of the invention.
Figure 5:
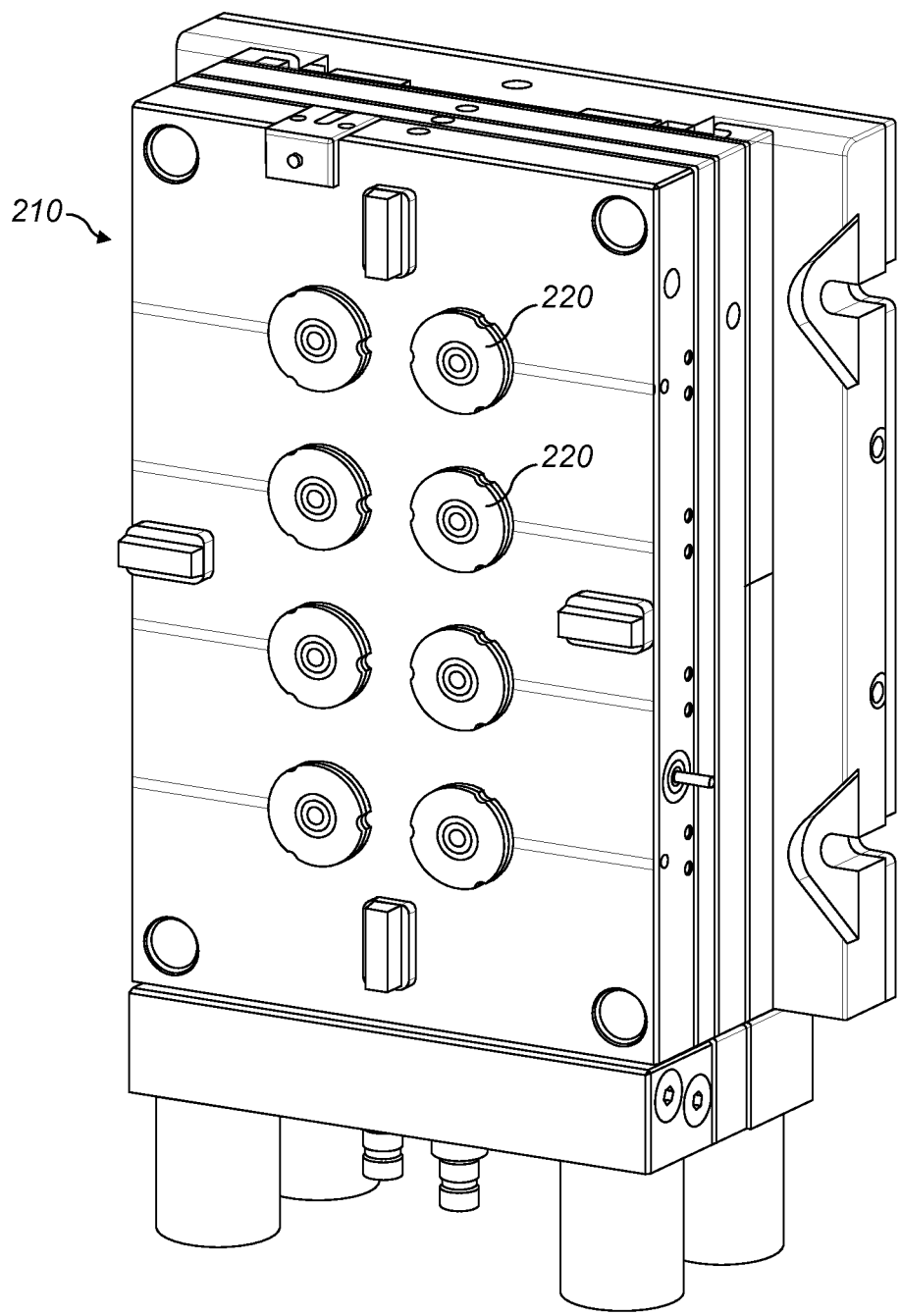
FIG. 5 is a perspective view of a mounting plate forming part of a reciprocating unit, in accordance with an embodiment of the invention.
Figure 6:
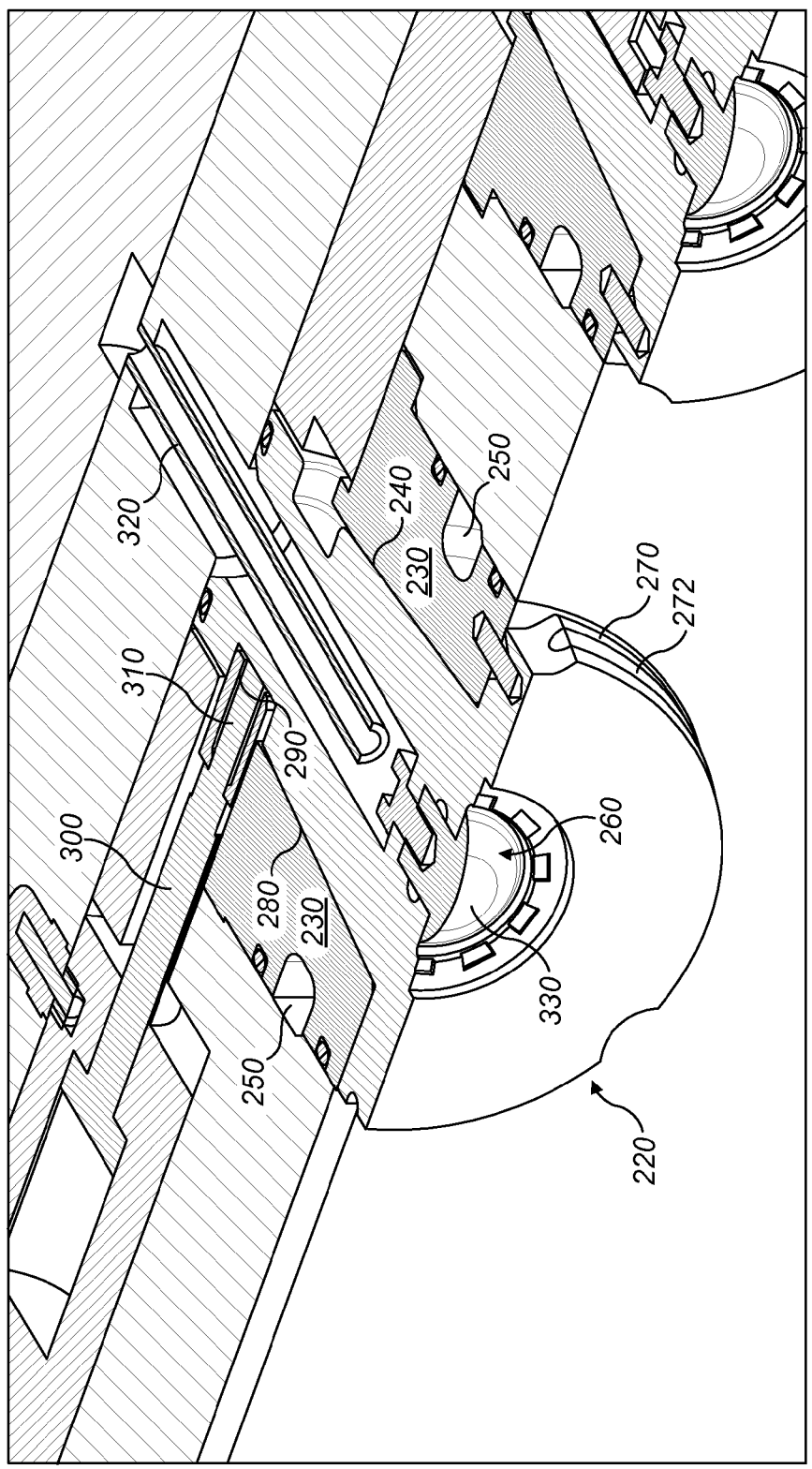
FIG. 6 is a partial cross-sectional view through a tool half of a mounting plate, in accordance with an embodiment of the invention.

As shown in FIGS. 4-6, mounting plate 190 carries a quick-change plate 210 that includes tool halves 220 that co-operate with tool halves 120 (FIG. 2) of the injection unit, to form injection cavities for formation of the molds. Specifically, quick-change plate 210 defines eight substantially cylindrical bushings 230 each carrying a collet 240 shown in FIG. 6. Each bushing 230 includes coolant passages 250 around its outer circumference. Each collet 240 carries a tool insert 260. Each collet 240 has a front disc portion 270 and a frustoconical body portion 280. Frustoconical body portion 280 includes, toward its rear, an annular groove 290. Reciprocating unit 50 includes a clamp 300 having a distal clamping portion 310 that engages with groove 290 of collet 240 and secures collet 240 toward the rear of quick-change plate 210, away from the face of plate 210, to retain collet 240 in quick-change plate 210. This clamping prevents both leakage of coolant, and collet 240 from dropping out of quick-change plate 210 when quick-change plate 210 is not in contact with fixed plate 110. A tube 320 runs along the centre of frustoconical body portion 280 forming a coolant passage, with coolant passing inside the tube 320 from the rear of body portion 280 to the rear of tool insert 260, and then back towards the rear of body portion 280 along the outside of the tube 320

Each collet 240 can be unclamped, removed, and replaced independently of other collets 240, enabling flexible interchange of collets 240, and each collet can carry a different tool insert 260. In particular, it is not necessary to replace the whole quick-change plate 210, nor is it necessary to replace individual tool inserts 260, which are vulnerable to damage, directly.

Inserts 260 include an outermost surface 330 that is convex in this example, and that defines an optical-quality surface that in-turn defines a concave surface of a mold half. The surface of the mold half in-turn defines an optical surface of a contact lens to be formed using the mold half. Optical surface 330 and an outermost portion of collet 240 together define an inner surface of a mold half to be formed in the injection cavity.

Thus, the injection cavity for forming the mold half is defined, on one hand, by the outermost surface of tool portion 150 and the stripper plate carried in each tool half 120 of fixed plate 110 of the injection unit. On the other hand, the mold half is also defined by the outermost portion of collet 240 and optical-quality surface 330 of tool insert 260 carried by quick-change plate 210 on reciprocating unit 50.

In this arrangement, the tool providing the optical surface in the mold is in quick-change plate 210 and not in fixed plate 110 that instead has the injection-molding parts. Consequently, a different optical surface can be readily provided in a mold by changing tool insert 260, without a need to disassemble the injection mechanism.

In injection unit, a screw is arranged to transport pellets from a pellet inlet to a nozzle. The pellets then pass into the heated inlet bush, where they are heated beyond their melting point, and the resultant liquid polymer flows into a manifold and then to the outlets of the manifold and into (FIG. 3) injection nozzles 130 of tool halves 120 of fixed plate 110. The melted polymer then passes into the injection cavity for forming the mold half.

Heating is provided by a coil around injection nozzle 130. Thermocouple 140, arranged on the opposite side of tool portion 150 from injection nozzle 130, is used to monitor the temperature of the injected polymer. Heating of nozzle 130 is controlled to ensure that the liquid polymer is injected into each of the eight injection cavities at the same temperature, and hence at the same flow rate. Non-constant flow rates result in stresses in the formed mold, which in turn result in deformations and inconsistencies in contact lenses formed from the molds, for example, different levels of fit, different radii, and hence, different powers. Careful control of pressure and cooling gives consistency and uniformity; in contrast, poor control can result in a need to stop injection, selectively, into cavities for which the flow rate has deviated too far from a target value.

Once the cavity is full of polymer and a desired hold pressure profile applied, the pins in injection nozzles 130 are moved forward to shut off injection nozzles 130, from the cavities, which stops the flow of polymer. Coolant, for example, water, is circulated through coolant flow passages 165 to cool the polymer and thereby form the mold. Coolant flow passages 165, 250 in tool halves 120, 220 pass close to the outermost surface of tool portion 150 and the optical-quality surface of tool insert 260 carried by quick-change plate 210, respectively. Such an arrangement provides direct cooling in the portion of the mold half that forms the optic zone of the lens as the mold half forms in the cavity. (Rapid cooling of nucleated material results in good quality, uniform molds. Without nucleation, slower cooling in the middle of the material can result, forming bigger crystals in the middle of the material.) Once the mold is formed, reciprocating drive 200 moves mounting plate 190, and with it, quick-change plate 210, away from fixed plate 110, opening the cavity. The newly formed mold remains in tool portion 150 in fixed plate 110. The stripper plate moves from the rearward, mold-forming position, to the forward, mold-ejecting position, pushing on the peripheral regions of the mold to eject it from the tool portion in fixed plate 110. In some embodiments, one or more ejector pins can be used to eject the mold.

In use, as described above, reciprocating drive 200 moves quick-change plate 210 into contact with fixed plate 110 of the injection unit, forming the injection cavities. Molten polymer is injected and cooled, and eight molds are thereby formed. Reciprocating drive 200 then moves quick-change plate 210 out of contact with fixed plate 110 of the injection unit, leaving the mold halves in tool portions 150 of fixed plate 110.

Figure 7:
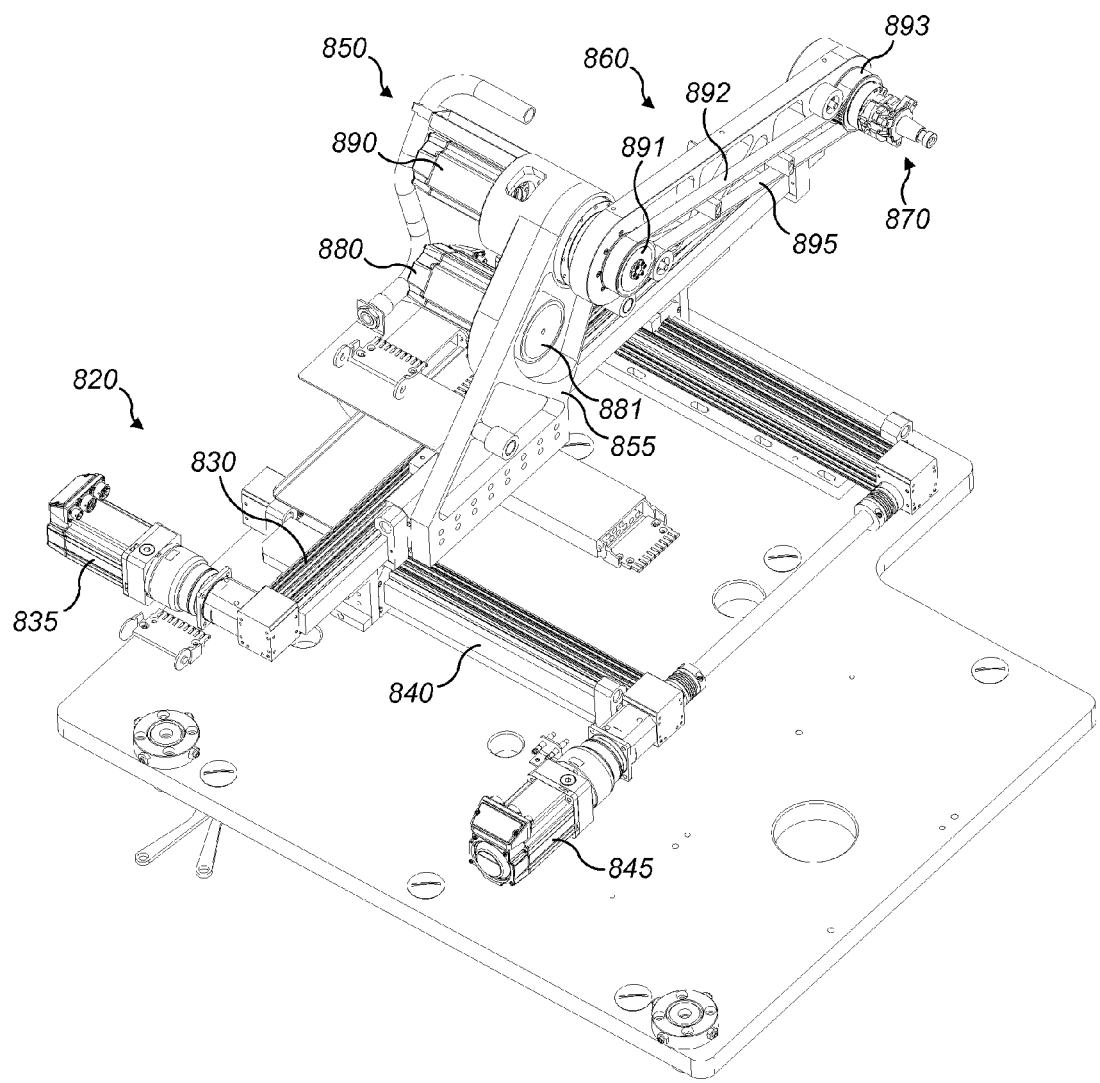
FIG. 7 is a perspective view of a collet-exchange robot, in accordance with an embodiment of the invention.

When it is desired to change the tool or tool assembly in order to change the power or type of contact lenses being manufactured, a collet-exchange subsystem is activated. The collet-exchange subsystem comprises a collet store 810 (FIG. 11) and a collet-exchange robot 820 (FIG. 7). As will be described further below, collet-exchange robot 820 removes a collet 220 from quick-change plate 210, and replaces it with a replacement collet 240 from collet store 810.

As illustrated in FIG. 7, collet exchange robot 820 comprises a drive unit 850 carrying an arm 860, at a distal end of which is rotatably mounted a collet extraction head 870. Drive unit 850 is mounted on a first rail 830, along which drive unit 850 is translated by a first linear motor 835. First rail 830 is itself mounted on a rail pair 840 that is perpendicular to first rail 830. First rail 830, and together with it, drive unit 850, are translated along rail pair 840 by a second linear motor 845. Such a mounting arrangement enables drive unit 850 to be moved to anywhere within a two-dimensional, horizontal area.

Figure 8:
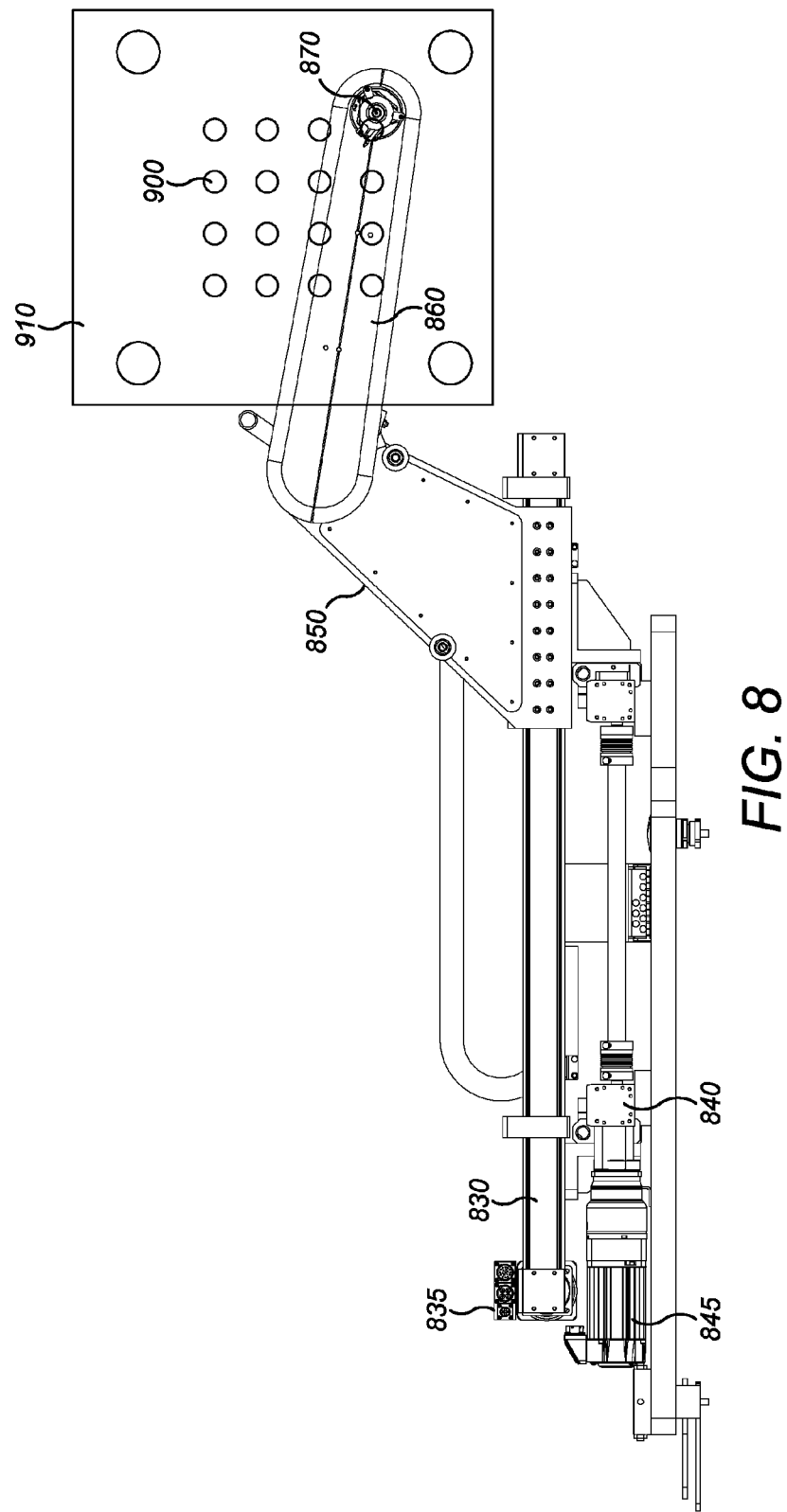
FIG. 8 is a side view of a collet-exchange robot and a two-dimensional array of collets arranged in a vertical plane, in accordance with an embodiment of the invention.

A further degree of movement is provided by the mounting of arm 860 on drive unit 850, as shown in FIGS. 7 and 8. Drive unit 850 includes two electric motors 880, 890 mounted on first rail 830 by a bracket 855. Arm 860 is rotatably mounted on an axle passing into bracket 855. The drive shaft of lower electric motor 880 carries a pulley 881 which is connected via a drive belt (not shown) to a pulley (not shown) rigidly connected to the axle on which arm 860 is mounted, so that operation of lower electric motor 880 causes arm 860 to rotate about the axle. The drive shaft of upper motor 890 carries a pulley 891 that is connected via a drive belt 892 to a pulley 893 that is rigidly connected to head 870. Operation of upper electric motor 890 thereby causes head 870 to rotate.

Quick change plate 210 and collet store 810 each presents to collet exchange robot 820 a two-dimensional array of collets 240, arranged in a vertical plane. FIG. 8 illustrates how collets 900 mounted in a plate 910 are accessed. Movement of drive unit 850 along first rail 830 moves collet extraction head 870 between vertical columns of collets 900. Rotation of arm 860, in combination with movement of drive unit 850 along first rail 830, moves collet extraction head 870 between horizontal rows of collets 900. Movement of drive unit 850 forward and backward along rail pair 840 moves collet extraction head 870 toward and away from plate 910, permitting insertion and extraction of collets 900 from plate 910. Arm 860 can also rotate about 180 degrees around an axis of rotation, from a first orientation in which collet extraction head 870 is on a first side of arm 860, and a second orientation in which collet extraction head 870 is on a second side of arm 860. Thus, collet extraction head 870 can be moved in three dimensions, enabling access to each collet 900. In take-out cell 30 (FIG. 1), arm 860 in the first orientation has access to collets 240 in quick-change plate 210, and, in the second orientation, it has access to collets 240 in collet store 810. Thus, in use, collet exchange robot 820 is able to remove collets 240 from quick-change plate 210, and transfer them to, and insert them into, collet store 810, and vice versa.

Figure 9:
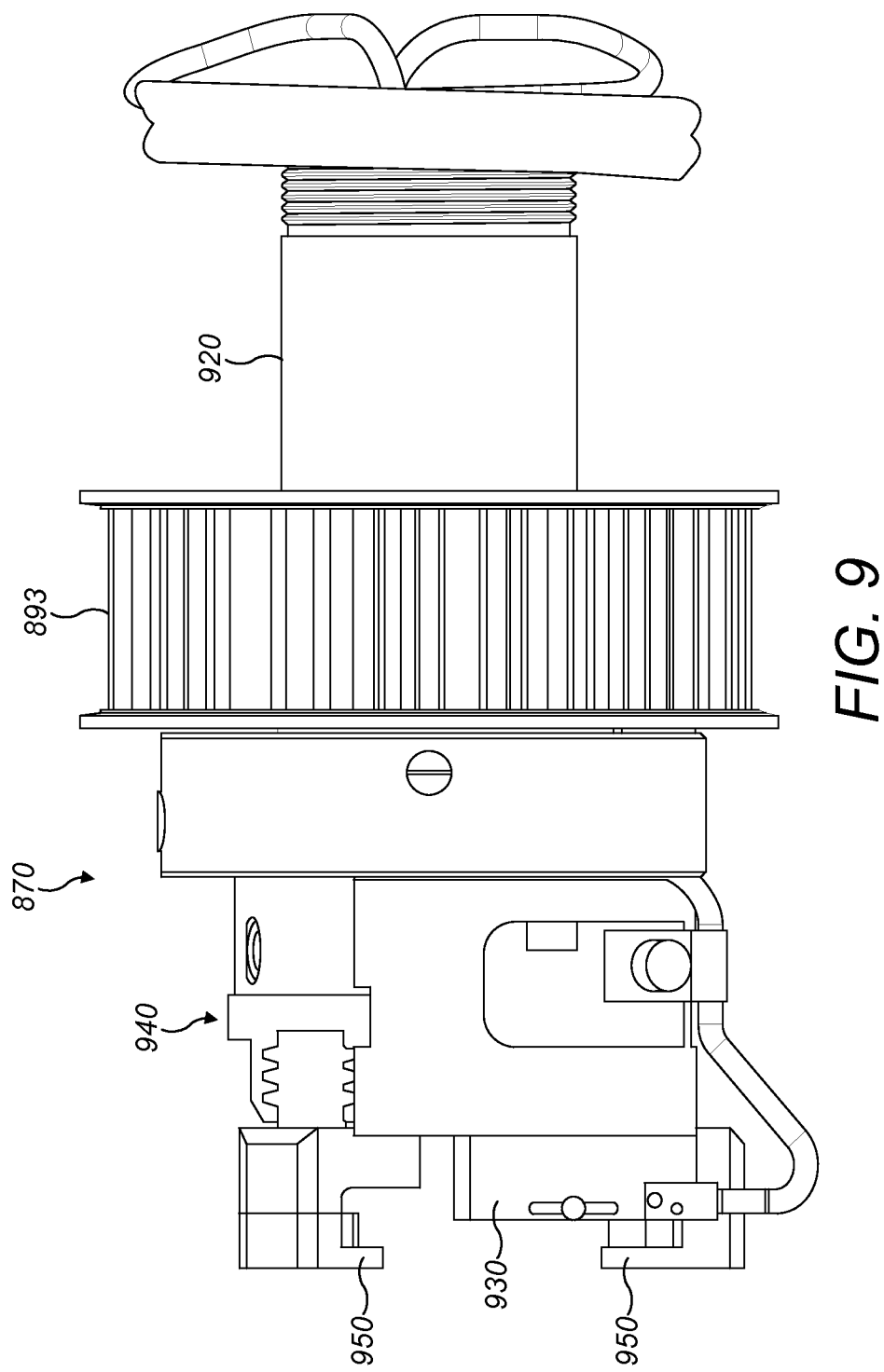
FIG. 9 is a side view of a collet extraction head including gripping fingers, in accordance with an embodiment of the invention.
Figure 10:
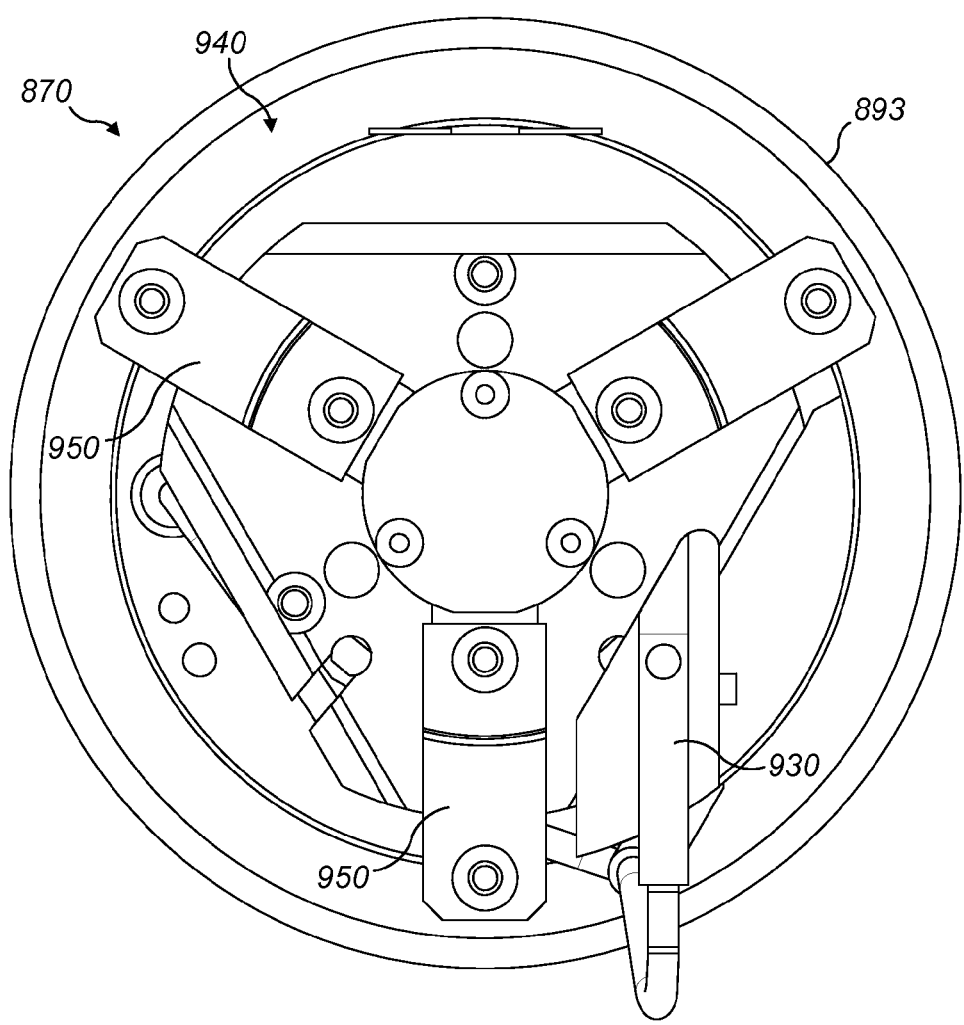
FIG. 10 is a front view of the collet extraction head of FIG. 9.

Collet extraction head 870 (FIGS. 9 and 10) comprises an axle 920, pulley 893, and gripping portion 940. Gripping portion 940 includes three gripping fingers 950. A proximity sensor 930 is also provided. With reference also to FIG. 6, gripping fingers 950 are sized and configured to grip a groove 272 that runs around the circumference of front disc portion 270 of collet 240. When gripping portion 940 is in position to grip collet 240, fingers 950 close into groove 272. Collet extraction head 870 can thus grip a collet 240 and carry it from quick-change plate 210 to collet store 810, or vice versa.

Figure 11:
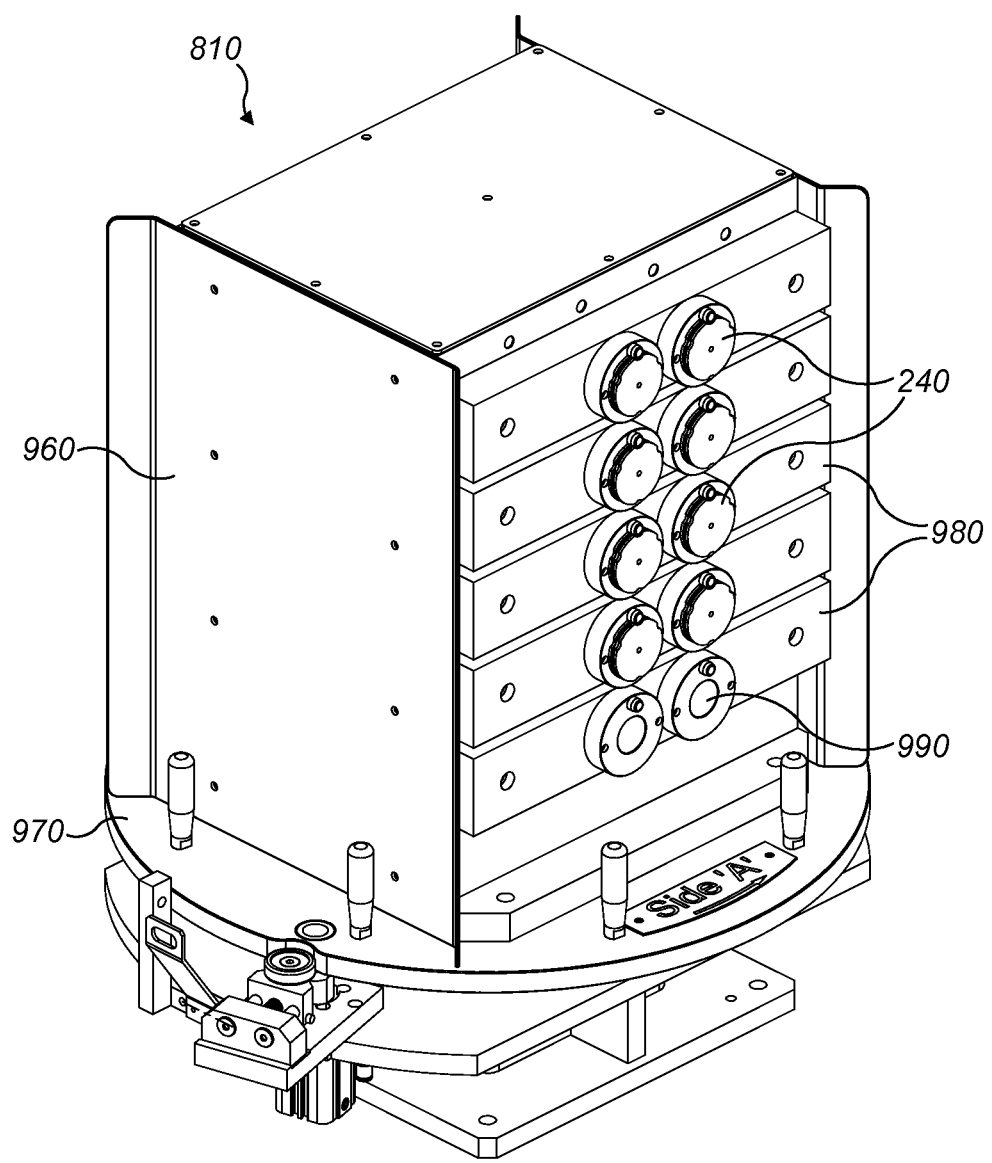
FIG. 11 is a perspective view of a collet store on a turntable, in accordance with an embodiment of the invention.

As shown in FIG. 11, collet store 810 includes a housing 960 mounted on a turntable 970. Housing 960 carries holding plates 980 that define ten circular apertures 990, each sized and configured to receive a collet 240.

When a collet 240 in the quick-change plate 210 is to be changed, the fixed plate 110 and the quick change plate 210 are separated and cooling water is evacuated from the coolant passages 250 and the tube 320. Air is blown through the coolant passages 250 and the tube 320 to remove residual water. Clamp 300 is released, leaving collet 240 free to be removed by exchange robot 820. Collet extraction head 870 of collet exchange robot 820 is then moved to a position in front of the particular collet 240 to be changed. Extraction head 870 is moved forward, and gripping fingers 950 grip groove 272 of collet 240. Exchange robot 820 moves backward, extracting collet 240 from quick-change plate 210, and then moves itself and extraction head 870 so that extraction head 870 is at a position in front of an empty aperture 990 in collet store 810. Robot 820 moves forward, and collet 240 is released from fingers 950, into aperture 990. Extraction head 870 is then moved to a position in front of replacement collet 240 that is to replace the collet that has just been moved. Gripping fingers 950 grip replacement collet 240 and extract it from collet store 810. Extraction head 870 is moved, with replacement collet 240, to the position in front of the quick-change plate from which it extracted moved collet 240. Replacement collet 240 is inserted into quick-change plate 210. Clamp 300 re-engages with annular groove 290 toward the rear of collet 240, clamping replacement collet 240 in place. Gripping fingers 950 release collet 240. Robot 820 moves out of the way, to a resting location. The supply of water is restored to the coolant passages 250 and the tube 320 and production of molds restarts. The steps involved in changing the collet 240, including the evacuation and re-supply of cooling water, are synchronised under the control of a central controller (not shown) to minimize the time required for the exchange.

All patents and publications cited herein are incorporated herein by reference in their entireties.

While the present disclosure has been described and illustrated with reference to particular embodiments, it will be appreciated by those of ordinary skill in the art that the disclosure lends itself to many different variations not specifically illustrated herein. By way of example only, certain possible variations are described herein.

In the foregoing description, where integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient, or the like, are optional and do not limit the scope of the independent claims. Moreover, it is to be understood that such optional integers or features, while of possible benefit in some embodiments of the disclosure, may not be desirable, and can therefore be absent, in other embodiments.

The invention claimed is:

1. An apparatus for manufacturing mold halves for use in the manufacture of contact lenses, the apparatus comprising:
    an injection-molding apparatus including a plate, a removable collet in the plate, and a clamp configured to hold the removable collet in the plate, wherein the removable collet comprises a frustoconical rear portion and a circumferential groove upon which the clamp acts;
    a tool half mounted in the removable collet;
    a collet store for storing at least one removable collet configured to be inserted into the plate, wherein the collet store comprises a housing for receiving a plurality of removable collets, and a turntable on which the housing is mounted; and
    a collet-exchange robot comprising at least one collet extraction head, wherein the collet-exchange robot is configured to grip a removable collet from the plate, move the removable collet to the collet store, insert the removable collet into the collet store, grip a replacement collet from the collet store, move the replacement collet to the plate, and insert the replacement collet into the plate,
    wherein the turntable being rotatable from a first position wherein a removable collet is manually loadable into the housing, to a second position wherein the removable collet is removeable from the collet store by the collet-exchange robot.

2. The apparatus as claimed in claim 1, wherein the collet extraction head is rotatably mounted on the collet-exchange robot.

3. The apparatus as claimed in claim 1, wherein the collet extraction head comprises a gripping portion.

4. A method of manufacturing contact lens mold halves, comprising:
    using a robot to remove a first collet from a plate in an injection-molding apparatus, the first collet comprising a first tool half mounted therein, the first tool half defining at least a portion of a first injection-molding cavity for molding a contact lens mold half, wherein the first collet comprises a frustoconical rear portion and a circumferential groove and is held in place in the plate prior to the removing with a clamp acting upon the circumferential groove, wherein the clamp is released from holding the first collet prior to the removing the first collet from the plate;
    using the robot to transport the first collet to a collet store and insert the first collet into the collet store, wherein the collet store comprises a housing for receiving a plurality of removable collets, and a turntable on which the housing is mounted, the turntable being rotatable from a first position wherein a removable collet is manually loaded into the housing, to a second position wherein the removable collet is removed from the collet store by the robot;

using the robot to remove a replacement collet from the collet store, the replacement collet comprising a second tool half defining at least a portion of a second injection-molding cavity for molding a contact lens mold half;

using the robot to transport the replacement collet to the plate and insert the replacement collet into the plate; and forming a contact lens mold half in the second injection-molding cavity.

5. The method of claim 4, wherein using the robot to remove the first collet, using the robot to transport the first collet and insert the first collet into the collet store, using the robot to remove the replacement collet, and using the replacement robot to transport the replacement collet and insert the replacement collet into the plate, comprises moving a collet extraction head of the robot in three dimensions.

6. The method of claim 4, wherein using the robot to remove the first collet from the plate comprises moving a collet extraction head of the robot to a position in front of the first collet; moving the collet extraction head forward, toward the first collet; gripping the first collet with the extraction head; and moving the collet extraction head backward, to extract the first collet from the plate.

7. The method of claim 6, wherein gripping the first collet with the collet extraction head comprises gripping the first collet at the circumferential groove formed in the first collet.

8. The method of claim 4, wherein coolant is removed from coolant passages associated with the first collet, prior to the removal of the first collet from the plate, and resupplied to said coolant passages after insertion of the replacement collet into the plate.

9. The method of claim 4, wherein using the robot to transport the first collet and insert the first collet into the collet store comprises: moving the collet extraction head so that the collet extraction head is in a position in front of an empty aperture in the collet store; moving the collet extraction head forward, toward the empty aperture; and releasing the first collet into the empty aperture.

10. The method of claim 4, wherein using the robot to transport the replacement collet and insert the replacement collet into the plate comprises: moving the collet extraction head to a position in front of the replacement collet; gripping the replacement collet with the collet extraction head; moving the collet extraction head to a position in front of the plate from which the first collet was removed; and inserting the replacement collet into the plate.

11. The method of claim 10, wherein gripping the replacement collet with the collet extraction head comprises gripping the replacement collet at a circumferential groove formed in the replacement collet.

12. The method of claim 4, further comprising clamping the replacement collet into the plate.

13. The method of claim 4, further comprising moving the robot to a resting location after using the robot to insert the replacement collet into the plate.

14. A method for manufacturing contact lens mold halves and a contact lens, comprising:

using a robot to remove a first collet from a plate in an injection-molding apparatus, the first collet comprising a first tool half mounted therein, the first tool half defining at least a portion of a first injection-molding cavity for molding a contact lens mold half, wherein the first collet comprises a frustoconical rear portion and a circumferential groove and is held in place in the plate prior to the removing with a clamp acting upon the circumferential groove, wherein the clamp is released from holding the first collet prior to the removing the first collet from the plate;

using the robot to transport the first collet to a collet store and insert the first collet into the collet store, wherein the collet store comprises a housing for receiving a plurality of removable collets, and a turntable on which the housing is mounted, the turntable being rotatable from a first position wherein a removable collet is manually loaded into the housing, to a second position wherein the removable collet is removed from the collet store by the robot;

using the robot to remove a replacement collet from the collet store, the replacement collet comprising a second tool half defining at least a portion of a second injection-molding cavity for molding a contact lens mold half;

using the robot to transport the replacement collet to the plate and insert the replacement collet into the plate; and forming a contact lens mold half in the second injection-molding cavity, wherein forming the contact lens mold half in the second injection-molding cavity comprises: providing a complementary contact lens mold half; combining the contact lens mold half and the complementary contact lens mold half to form a mold assembly having a lens-shaped cavity there between; curing a polymerizable composition in the lens-shaped cavity to form a polymeric lens body; demolding and delensing the polymeric lens body from both the contact lens mold half and the complementary contact lens mold half, to form a released polymeric lens body; optionally washing, extracting, hydrating, or any combination thereof, the released polymeric lens body; placing the released polymeric lens body in a contact lens package; sealing the filled contact lens package; and sterilizing the sealed contact lens package to form a finished contact lens package containing a finished contact lens.

* * * * *